US011956498B2

(12) United States Patent
Ikarashi et al.

(10) Patent No.: US 11,956,498 B2
(45) Date of Patent: Apr. 9, 2024

(54) MOVIE CREATION METHOD, NON-TRANSITORY COMPUTER READABLE MEDIUM, AND MOVIE CREATION APPARATUS

(71) Applicant: Honda Motor Co., Ltd., Tokyo (JP)

(72) Inventors: Makiko Ikarashi, Tokyo (JP); Takaya Higuchi, Tokyo (JP); Haruka Miyata, Tokyo (JP); Arisa Omura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 18/071,944

(22) Filed: Nov. 30, 2022

(65) Prior Publication Data
US 2023/0179829 A1   Jun. 8, 2023

(30) Foreign Application Priority Data
Dec. 6, 2021   (JP) ................. 2021-197529

(51) Int. Cl.
*H04N 21/44* (2011.01)

(52) U.S. Cl.
CPC . *H04N 21/44008* (2013.01); *H04N 21/44016* (2013.01)

(58) Field of Classification Search
CPC ....... H04N 21/44008; H04N 21/44016; H04N 21/4223; H04N 21/47205; H04N 21/8549; H04N 21/41407
See application file for complete search history.

(56) References Cited

FOREIGN PATENT DOCUMENTS

JP    2002140450 A    5/2002
JP    2004357774 A    12/2004

*Primary Examiner* — Anthony Bantamoi
(74) *Attorney, Agent, or Firm* — Duft & Bornsen, PC

(57) ABSTRACT

Movie creation method for creating movie by photographing video clips, including: executing movie project. Movie project includes: determining number of video clips to be photographed by camera; outputting control signal to camera to photograph determined number of video clips; outputting control signal to positioning unit to acquire position information on photographing location of each of video clips; calculating total travel distance for photographing determined number of video clips by connecting photographing location by straight line in order of photographing; setting first incentive for user of camera based on total travel distance; setting second incentive for user when photographing location is predetermined location; calculating first travel distance required to set first incentive; calculating second travel distance required to set second incentive; and outputting control signal to display to display first travel distance and second travel distance on one single display screen in order of distance.

9 Claims, 9 Drawing Sheets

MOVIE CREATION METHOD, NON-TRANSITORY COMPUTER READABLE MEDIUM, AND MOVIE CREATION APPARATUS

CROSS-REFERENCE TO RELATED APPLICATION

This application is based upon and claims the benefit of priority from Japanese Patent Application No. 2021-197529 filed on Dec. 6, 2021, the content of which is incorporated herein by reference.

BACKGROUND OF THE INVENTION

Field of the Invention

This invention relates to a movie creation method, non-transitory computer readable medium, and movie creation apparatus configured to create movie.

Description of the Related Art

Portable wireless terminals such as smartphones can take video in addition to still images. In general, video recording functions using portable wireless terminals have fewer opportunities to be used than still image recording functions, so some effort is needed to increase the opportunities for use of video recording functions.

It has been known to provide incentives such as content to users to encourage them to use the functions provided by portable wireless terminals. For example, Japanese Patent Application Laid-Open No. 2002-140450 (JP 2002-140450 A) discloses a technology for receiving and playing back content related to location information.

Japanese Patent Application Laid-Open No. 2004-357774 (JP 2004-357774 A) discloses a technology for determining scores to be used on a game based on the distance traveled by a moving object as a technology for providing content as an incentive.

However, both technologies are difficult to motivate users to actively take videos. i.e., although the technology exists to provide bonuses, it has not led to the use of the video recording function.

SUMMARY OF THE INVENTION

An aspect of the present invention is a movie creation method for creating a movie by photographing a plurality of video clips, including: executing a movie project. The movie project includes: determining a number of the video clips to be photographed by a camera; outputting a control signal to the camera to photograph the determined number of the video clips; outputting a control signal to a positioning unit to acquire position information on a photographing location of each of the video clips; calculating a total travel distance for photographing the determined number of the video clips by connecting the photographing location by a straight line in order of photographing; setting a first incentive for a user of the camera based on the total travel distance; setting a second incentive for the user when the photographing location is a predetermined location; calculating a first travel distance required to set the first incentive; calculating a second travel distance required to set the second incentive; and outputting a control signal to a display to display the first travel distance and the second travel distance on one single display screen in order of distance.

Another aspect of the present invention is a non-transitory computer readable medium storing a movie creation program that, when executed by an electronic device including: a microcomputer; a camera configured to photograph a video clip; a positioning unit configured to acquire position information on a photographing location of the video clip; and a display configured to display information, causes the microcomputer to execute a movie project for creating a movie by photographing a plurality of the video clips. The movie project includes: determining a number of the video clips to be photographed by the camera; outputting a control signal to the camera to photograph the determined number of the video clips; outputting a control signal to the positioning unit to acquire the position information on the photographing location of each of the video clips; calculating a total travel distance for photographing the determined number of the video clips by connecting the photographing location by a straight line in order of photographing; setting a first incentive for a user of the camera based on the total travel distance; setting a second incentive for the user when the photographing location is a predetermined location; calculating a first travel distance required to set the first incentive; calculating a second travel distance required to set the second incentive; and outputting a control signal to the display to display the first travel distance and the second travel distance on one single display screen in order of distance.

Another aspect of the present invention is a movie creation apparatus configured to execute a movie project for creating a movie by photographing a plurality of video clips. The movie creation apparatus includes: a camera configured to photograph the video clips; a positioning unit configured to acquire position information on a photographing location of each of the video clips; and a display configured to display information. The movie project includes: determining a number of the video clips to be photographed by the camera; outputting a control signal to the camera to photograph the determined number of the video clips; outputting a control signal to the positioning unit to acquire the position information on the photographing location of each of the video clips; calculating a total travel distance for photographing the determined number of the video clips by connecting the photographing location by a straight line in order of photographing; setting a first incentive for a user of the camera based on the total travel distance; setting a second incentive for the user when the photographing location is a predetermined location; calculating a first travel distance required to set the first incentive; calculating a second travel distance required to set the second incentive; and outputting a control signal to the display to display the first travel distance and the second travel distance on one single display screen in order of distance.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Embodiments of the present invention will be described below with reference to drawings.

<Outline of Movie Creation Program>

First, a movie creation program according to an embodiment is outlined.

The movie creation program is an application program that is executed on an electronic device such as a smartphone. Hereinafter it will be referred to simply as a movie creation application. The electronic device is not limited to a portable wireless terminal such as a smartphone, but may also be a tablet computer that includes a camera and a positioning unit or can be connected to them.

Figure 1A:
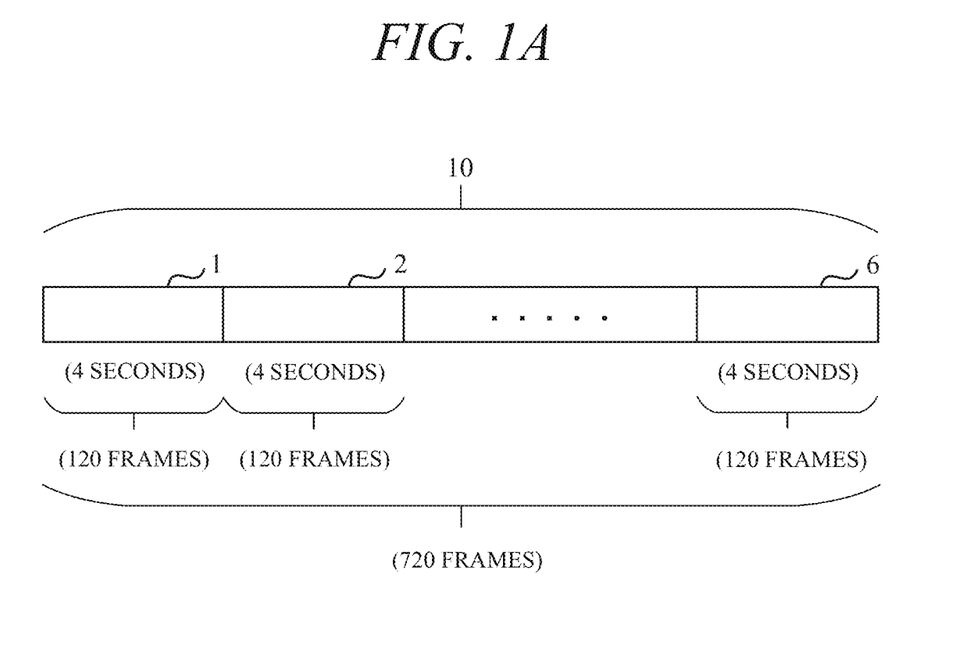
FIG. 1A is a schematic diagram illustrating a video created by an electronic device executing a movie creation application according to an embodiment of the present invention.

By running the movie creation application, the electronic device will be able to create a video based on a plurality of video clips taken by the camera. FIG. 1A is a schematic diagram illustrating a video 10 created by an electronic device. A video 10 illustrated in FIG. 1A is composed of six video clips (video clips 1, 2, 3, . . . , 6) with a recording time of 4 seconds per clip (4 seconds×6 video clips). The playback time of the created video 10 is 24 seconds, excluding the display time of the end-title and others, which is equal to the total recording time of the video clips 1 to 6.

The recording time per clip of 4 seconds, the number of clips of 6, the total recording time, and the playback time of the video 10 of 24 seconds are examples and may be changed as appropriate.

Each of the video clips 1 to 6 is a moving image taken and recorded as a sequence of images from the start to end of photographing (also referred to as recording). For example, when the number of frames per second is set to 30 frames per second (30 fps), the video clip 1 with a recording time of 4 seconds per clip is composed of 4 seconds×30 fps=120 frames. The same is true for the video clips 2 to 6. The video 10 made by combining the video clips 1 to 6 is composed of 120 frames×6 video clips=720 frames.

The embodiment assumes that the photographing locations (photographing positions) of the video clips 1 to 6 are different. That is, it is assumed that users of the electronic device will be asked to travel to different photographing locations to take the video clips 1 to 6.

(Filter Processing)

The movie creation application of the embodiment creates a video 10 by combining the video clips 1 to 6, and can also create a processed video 10. The processing executed by the movie creation application is referred to as filter processing.

The filter processing adds image effects, for example, by processing the color of the video clips 1 to 6 to monochrome, processing the hue of the video clips 1 to 6 to sepia tone, emphasizing specific colors in the video clips 1 to 6, blurring specific parts of the screen in the video clips 1 to 6, or blurring the entire screen in the video clips 1 to 6.

The movie creation application of the embodiment can create a video 10 processed with a filter that is arbitrarily selected by the user from a plurality of filter candidates prepared in advance. The user may apply the same filter to all the video clips 1 to 6. It is also possible to apply different filters to the video clips constituting the video 10.

When creating the video 10 with the movie creation application, filter processing is performed for the video clips 1 to 6, and the video clips 1 to 6 after filter processing may be combined to create a video 10, or a filter may be added after combining the video clips 1 to 6 to create a video 10.

The filter processing may be omitted in order to create a video 10 that makes use of the color tone or the like of the video clips 1 to 6 as they are.

Figure 1B:
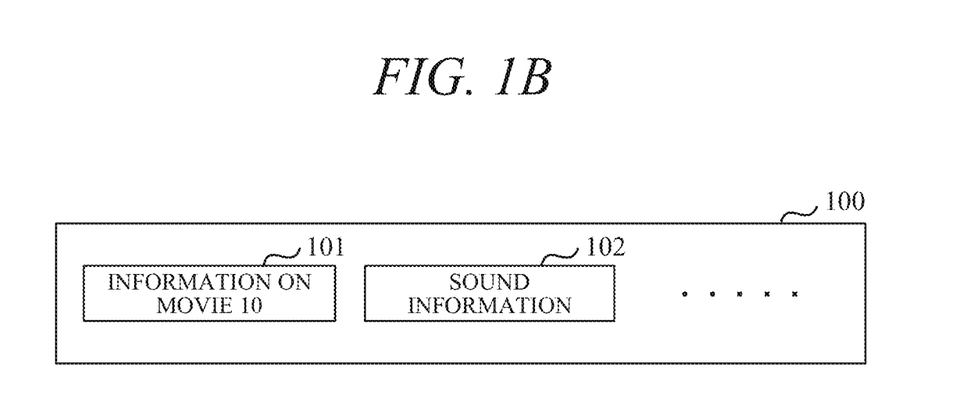
FIG. 1B is a schematic diagram illustrating a video file.

FIG. 1B is a schematic diagram illustrating a video file 100. Generally, the data of the video 10 (information 101 on the video 10) is recorded together with audio data (sound information 102) in a file format such as MP4. The file storing the information 101 on the video 10 and the sound information 102 is hereinafter referred to as a video file 100. The information 101 on the video 10 may include information on the photographing location.

(Addition of Music)

In the movie creation application of the embodiment, it is possible to record information on music selected arbitrarily by the user from a plurality of music candidates prepared in advance in the video file 100, together with the information 101 on the created video 10. The plurality of pieces of music information provided by the movie creation application include, for example, background music (BGM) information.

When a video based on the video file 100 created by the movie creation application is played on a general playback device, the user can listen to background music played based on the sound information 102 and watch the video played based on the information 101 on the video 10. The electronic device that executes the above movie creation application can also play back the video based on the information 101 on the video 10 (including BGM playing) as a playback device.

With the movie creation application outlined above, it is possible to take a plurality of video clips 1 to 6 with an electronic device, apply filters to the video clips 1 to 6, and create a video 10 by combining the video clips 1 to 6 after filter processing. The information 101 on the created video 10 can then be stored in the video file 100 together with the BGM information (sound information 102). This movie creation application is described in detail below.

<Examples of Electronic Devices>

Figure 2:
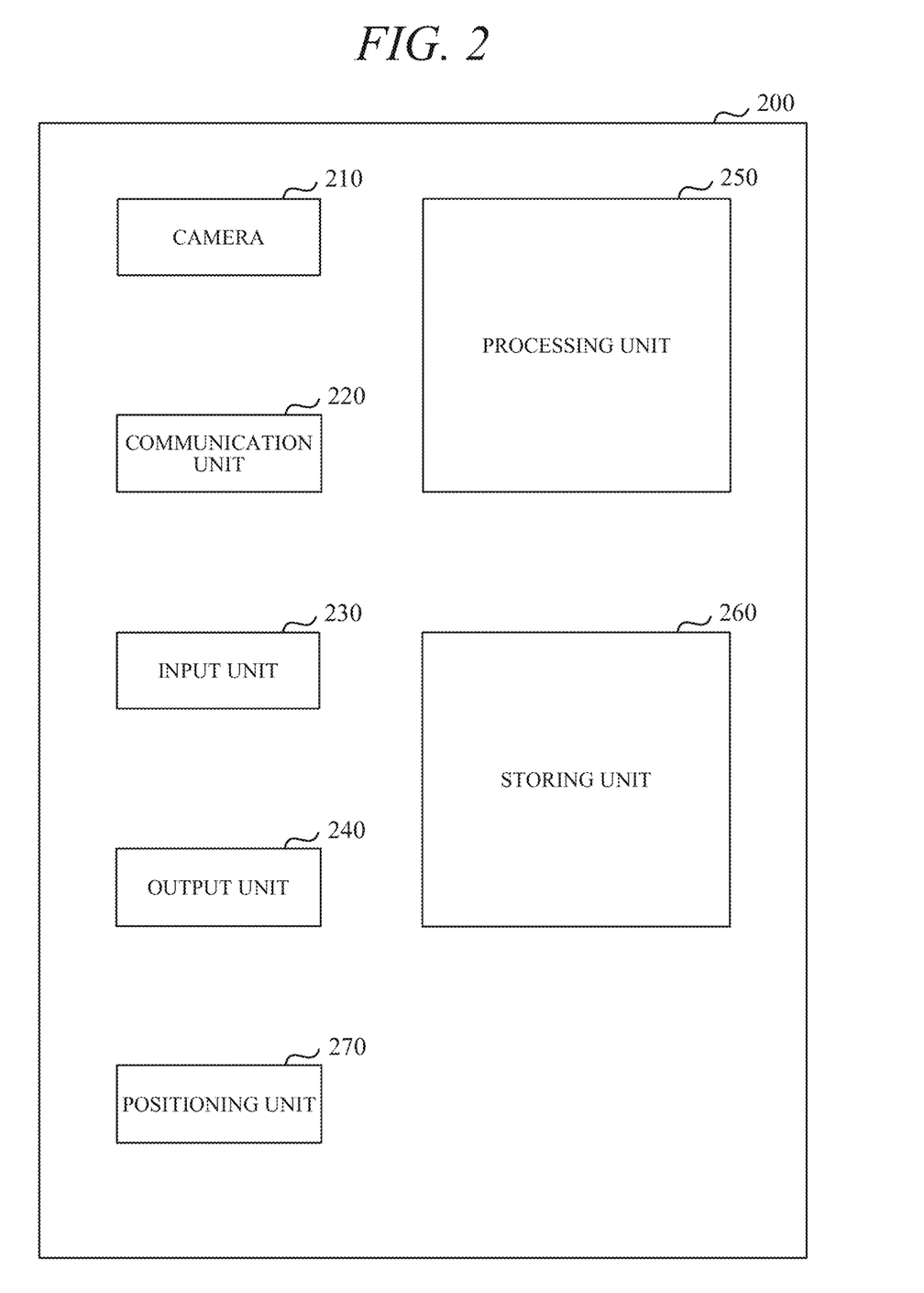
FIG. 2 is a block diagram illustrating key components of the electronic device executing the movie creation application.

FIG. 2 is a block diagram illustrating the key components of an electronic device 200 executing a movie creation application. In FIG. 2, the electronic device 200 is composed of a smartphone or the like, and includes a camera 210, a communication unit 220, an input unit 230, an output unit 240, a processing unit 250, a storing unit 260, and a positioning unit 270.

The camera 210 photographs the subject and outputs the image data to the processing unit 250 as image information. The camera 210 is configured to take still images or video. In the embodiment, a 4-second video (corresponding to the video clips 1 to 6 described above) is taken plural times (corresponding to 6 times described above). The communication unit 220 executes wireless communication with external devices connected via communication networks such as wireless communication networks, Internet networks, and telephone line networks.

Since the electronic device 200 executing the movie creation application can execute all processes related to the movie creation application on the electronic device 200, there is no need to communicate with a server or other external device regarding the movie creation application during execution of the movie creation application.

The input unit 230 includes various user-operated operation units such as touch-operated components and switches, and a microphone for inputting voice projected by the user. The output unit 240 includes, for example, a display that displays text information, images, and others, and a speaker unit that plays back sound and the like.

The user inputs the startup and setting operations of the movie creation application via the input unit 230, either by tapping or by voice input.

The processing unit 250 includes a microcomputer and its peripheral circuits. The processing unit 250 executes predetermined processes based on signals input via the input unit 230, signals received from outside via the communication unit 220, and data stored in the storing unit 260, and outputs control signals to the various parts of the electronic device 200, including the camera 210, communication unit 220, output unit 240, storing unit 260, and positioning unit 270.

The processes executed by the processing unit 250 allows the user to proceed with the photographing of the video clips 1 to 6 by the camera 210, the filter processing and music selection described above, and the video creation processes, while checking the information displayed on the output unit 240, according to the process flow of the movie creation application described below with reference to FIGS. 3 and 4.

The storing unit 260 includes a volatile or nonvolatile memory (not illustrated). The storing unit 260 stores various programs, including the movie creation application executed by the processing unit 250, and various data, including information on the video clips 1 to 6 to be taken, and the video files 100 to be created.

The positioning unit 270 detects the current position of the electronic device 200 based on positioning signals from global positioning system (GPS) satellites and quasi-zenith satellites. The signal indicating the current position of the electronic device 200 is output to the processing unit 250.

<Description of Flowchart>

Figure 3:
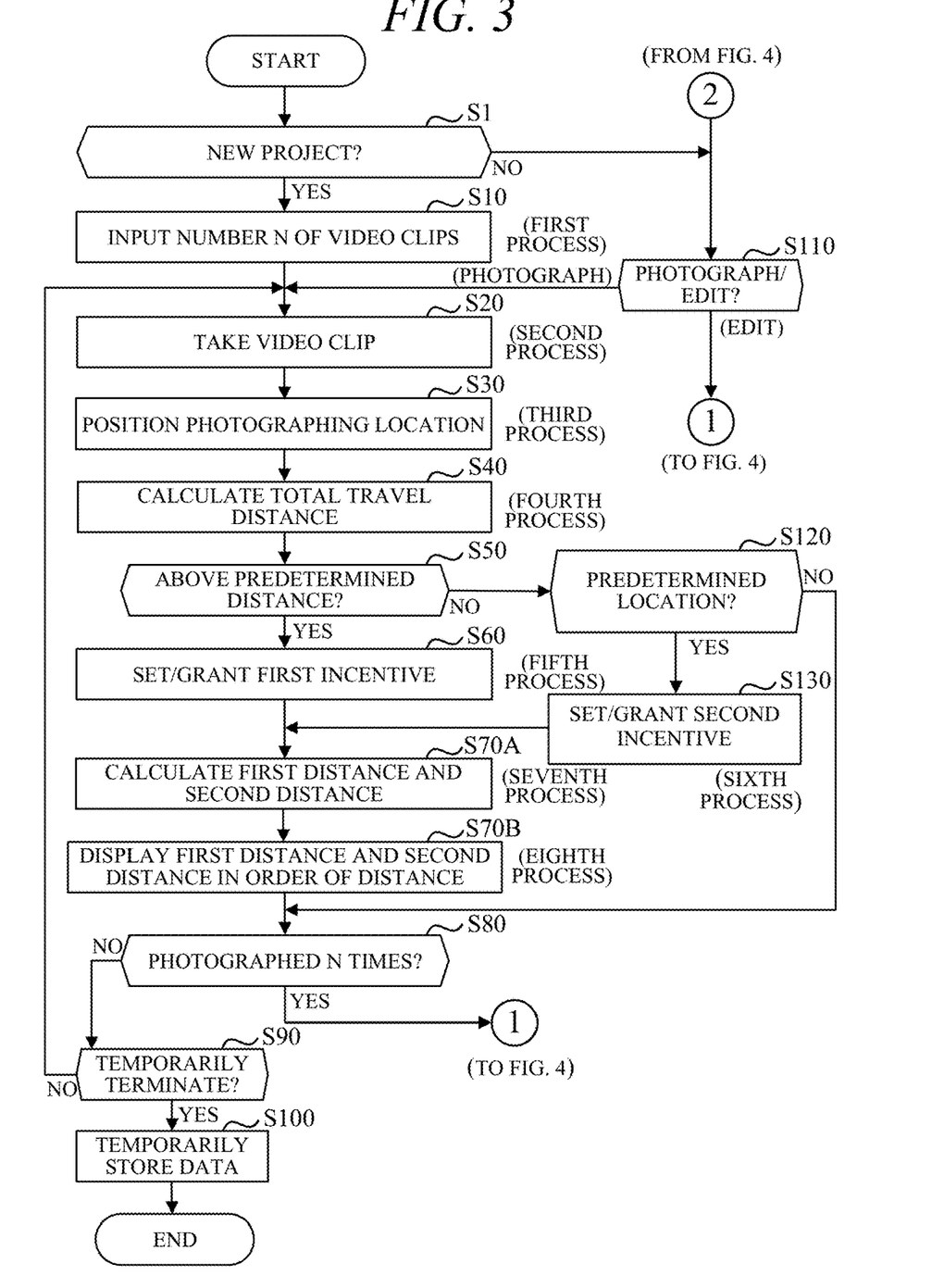
FIG. 3 is a flowchart illustrating flow of processes executed by a processing unit shown in FIG. 2 by the movie creation application.
Figure 4:
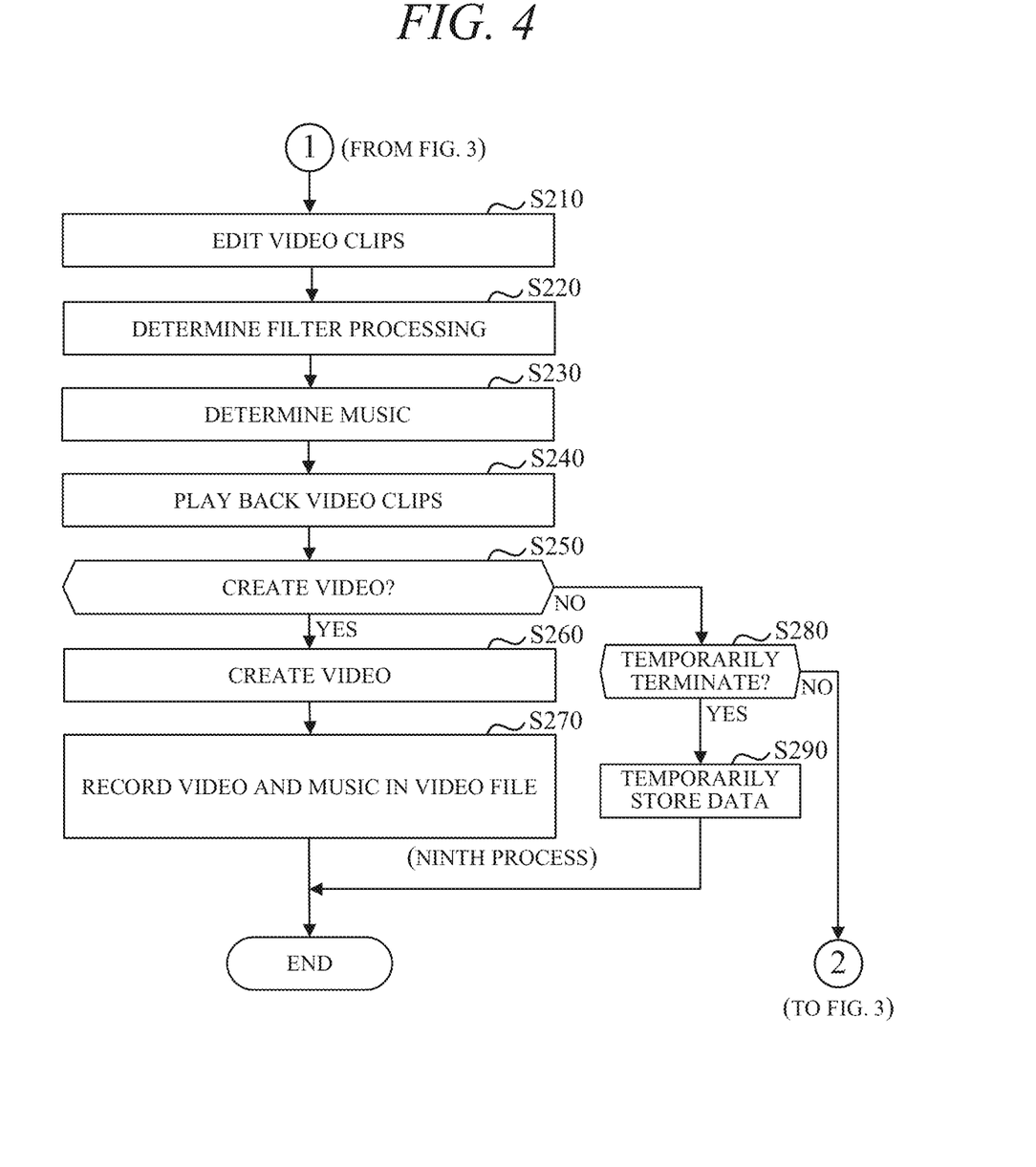
FIG. 4 is a flowchart illustrating flow of processes executed by the processing unit shown in FIG. 2 by the movie creation application.

FIGS. 3 and 4 are flowcharts illustrating the flow of processes executed by the processing unit 250 in FIG. 2 by the movie creation application. When the icon associated with the movie creation application among the icons displayed on the output unit 240, which are not illustrated, is tapped by the user, the processing unit 250 starts the movie creation application that executes the flows of FIGS. 3 and 4.

In S1 (S: processing step) of FIG. 3, the processing unit 250 determines whether it is a new project. In the embodiment, the series of processes of taking a plurality of video clips (for example, video clips 1 to 6) and creating the video 10 that combines the video clips 1 to 6 is referred to as a movie project. The embodiment allows a plurality of movie projects to proceed in parallel. The processing unit 250 makes a positive determination in S1 and proceeds to S10 when taking new video clips 1 to 6 as a new movie project. When taking a new video clip to be added to an existing video clip stored in the storing unit 260 as a movie project in progress or taking a new video clip to replace an existing video clip, the processing unit 250 makes a negative determination in S1 and proceeds to S110.

In S10, the processing unit 250 determines the number of video clips N based on the operation input by the user via the input unit 230 and proceeds to S20. The number of video clips N is the number of video clips constituting a video 10. In the embodiment, it is assumed that N=6 is entered by the user. When N=6 is entered, the processing unit 250 determines the photographing time per clip to be 4 seconds so that the total recording time is 24 seconds. If N=12 is entered, the processing unit 250 determines the photographing time per clip to be 2 seconds so that the total recording time is 24 seconds. The process executed in S10 may be referred to as first process.

In S20, the processing unit 250 outputs a control signal to the camera 210, causes the camera 210 to take a video clip, and proceeds to S30. For example, when the photographing button 56 (FIG. 6C below) displayed on the output unit 240 is tapped, the processing unit 250 causes a video clip to be taken for 4 seconds. The process executed in S20 may be referred to as second process.

In S30, the processing unit 250 outputs a control signal to the positioning unit 270, causes the positioning unit 270 to position the current position of the electronic device 200, and proceeds to S40. The positioning unit 270, for example, acquires information indicating the current position at the time the video clip was started to be taken and outputs it to the processing unit 250 as information on the photographing location of the video clip. The process executed in S30 may be referred to as third process.

Since the positioning unit 270 positions only at the start of taking the video clip, allowing to reduce power consumption in the electronic device 200 compared to the case where positioning continues even during taking video clips (4 seconds in the embodiment).

Figure 5:
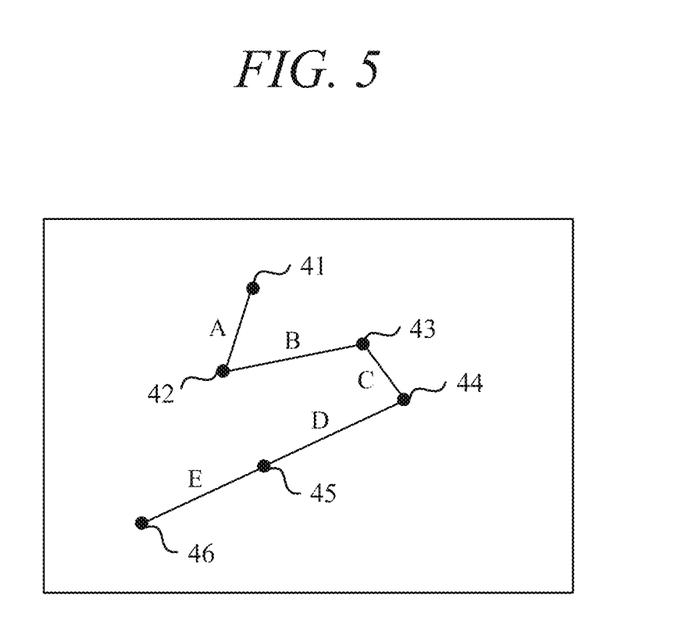
FIG. 5 is a diagram for describing a method of calculating a total travel distance.

In S40, the processing unit 250 calculates the total travel distance and proceeds to S50. FIG. 5 is a diagram for describing a method of calculating a total travel distance. In FIG. 5, the map indicates the photographing location 41 of the first video clip 1, the photographing location 42 of the second video clip 2, the photographing location 43 of the third video clip 3, the photographing location 44 of the fourth video clip 4, the photographing location 45 of the fifth video clip 5, and the photographing location 46 of the sixth video clip 6.

The processing unit 250 connects the photographing locations (photographing positions) 41 to 46 of the N=6 video clips by straight lines A, B, C, D, and E, respectively, in the order of photographing, and calculates the total distance indicated by the straight lines A to E as the total travel distance. In the embodiment, the cumulative total travel distance shall be calculated. For example, in a case where the processing unit 250 executes eight movie projects, the cumulative photographing number is six (N=6)×8=48, so the processing unit 250 calculates the total travel distance between the 48 photographing locations as the total travel distance. The process executed in S40 may be referred to as fourth process.

When the straight lines A, B, C, D, and E connecting the photographing locations 41 to 46 of the plurality of (for example, six) video clips in the order of photographing are located on a straight line of a predetermined width (not illustrated), the distance on the straight line of the predetermined width shall be excluded from the total travel distance in order to exclude overlapping travel distances.

In S50, the processing unit 250 determines whether the total travel distance is above the predetermined distance. Every time the total travel distance exceeds a predetermined distance (for example, 10 km), the processing unit 250 makes a positive determination in S50 and proceeds to S60. When the total travel distance is not above the predetermined distance, the processing unit 250 makes a negative determination in S50 and proceeds to S120.

In S60, the processing unit 250 sets and grants a first incentive and proceeds to S70A. In the embodiment, the first incentive is set and granted to the user by the business or other entity that provides the movie creation application every time the total travel distance exceeds 10 km. For example, the number of candidate songs of music information to be determined in S230, described below, is increased as the first incentive. The user who is granted the first incentive can choose songs from a larger number of candidate songs than users who are not granted the incentive. The process executed in S60 may be referred to as fifth process.

The processing unit 250 may also increase the number of filter candidates to be determined in S220, described below, as a first incentive.

In S70A, the processing unit 250 calculates the distance to be traveled before the next grant of the first incentive as the first travel distance information and the distance to be traveled before the next grant of the second incentive as the second travel distance information, and proceeds to S70B. The second incentive is described in S130 below. The process executed in S70A may be referred to as seventh process.

Figure 7A:
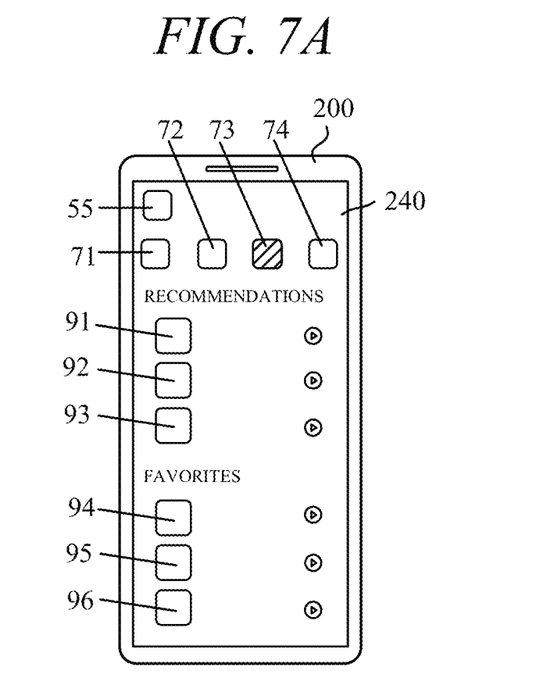
FIG. 7A is a diagram showing an example of a music decision screen.
Figure 7B:
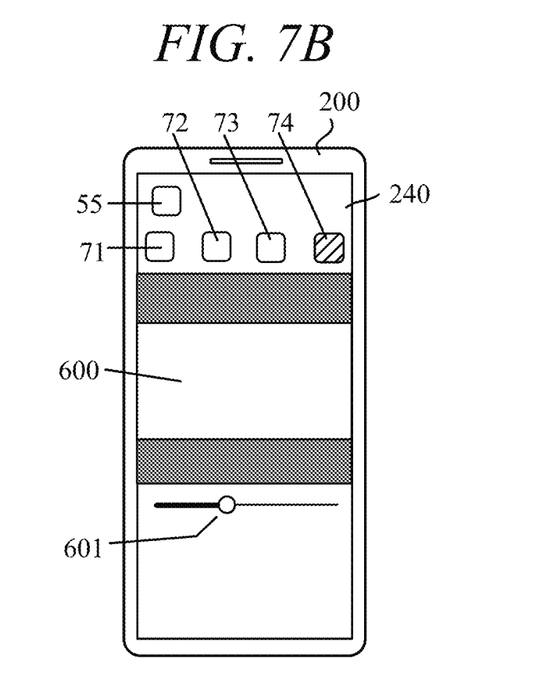
FIG. 7B is a diagram showing an example of a confirmation screen.
Figure 7C:
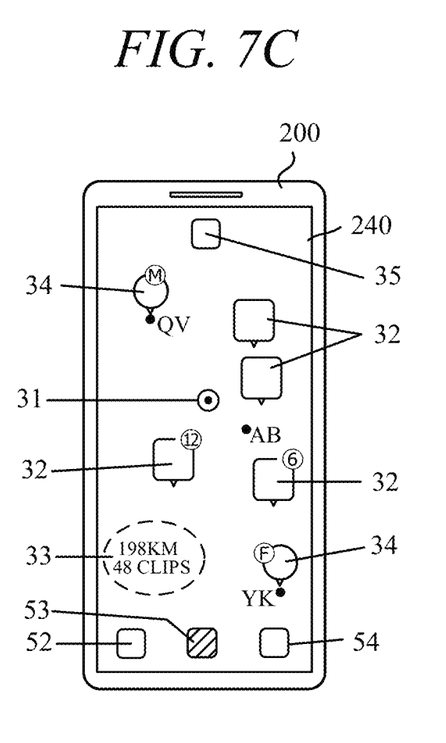
FIG. 7C is a diagram showing an example of a map confirmation screen.
Figure 7D:
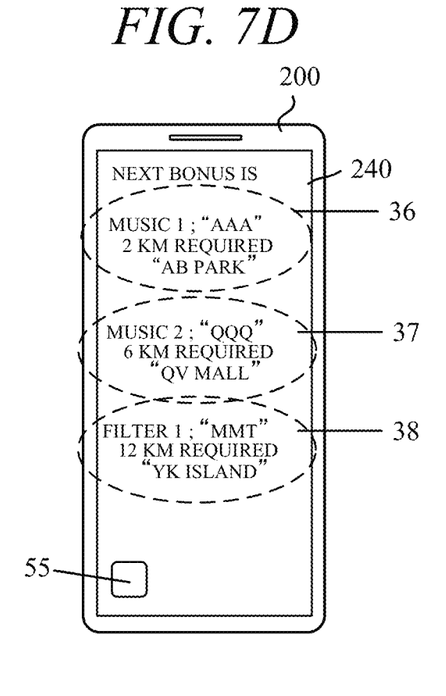
FIG. 7D is a diagram showing an example of a bonus list screen.

In S70B, the processing unit 250 outputs a control signal to the output unit 240 (display) to display the first and second travel distance information on the same screen of the output unit 240 in the order of distance for a predetermined time and proceeds to S80. Details of the display screen are described below with reference to the bonus list screen (FIG. 7D). The process executed in S70B may be referred to as eighth process.

In S80, the processing unit 250 determines whether the video clips have been taken N times. When the photographing number of video clips reaches N, the processing unit 250 makes a positive determination in S80 and proceeds to S210 in FIG. 4. When the photographing number of video clips is less than N times, the processing unit 250 makes a negative determination in S80 and proceeds to S90.

In the above-described processes of S10 to S80, 4-second video clips constituting the video 10 are taken 6 times, so the total recording time is 24 seconds. The movie creation application can proceed to the processes of FIG. 4 when the total recording time reaches 24 seconds. On the other hand, the movie creation application can be temporarily terminated without proceeding to the processes of FIG. 4.

In S90, the processing unit 250 determines whether to temporarily terminate the movie creation application. When the processing unit 250 temporarily terminates the movie creation application, it makes a positive determination in S90 and proceeds to S100. When the processing unit 250 continues the movie creation application, it makes a negative determination in S90 and returns to S20. When returning to S20, the processing unit 250 continues taking video clips.

In S100, the processing unit 250 temporarily stores the movie project data and other data in a predetermined area of the storing unit 260 (for example, a work area for the movie project) and terminates the flow in FIG. 3. As a result of S100 above, information on the video clip in the process of being taken (before the photographing number of video clips reaches N) (including information on the photographing location) is stored in the storing unit 260.

This allows video clips in the process of being taken to be properly stored, even when the movie creation application process is temporarily terminated, for example, while moving to the next photographing location or when other application is started on the electronic device 200.

In S110, where the processing unit 250 proceeds after making a negative determination in S1, the processing unit 250 determines whether to take video clips or to edit video clips that have already been taken. The processing unit 250 proceeds from S110 to S20 when, for example, taking video clip in a movie project that has been interrupted by a temporary termination. The processing unit 250 proceeds from S110 to S210 in FIG. 4 when editing video clips that have already been taken in a movie project that has been interrupted, for example, by a temporary termination.

In S120, where the processing unit 250 proceeds after making a negative determination in S50, the processing unit 250 determines whether the photographing location is a predetermined location or not. When the photographing location matches a predetermined location that has been previously associated with a bonus, the processing unit 250 makes a positive determination in S120 and proceeds to S130. When the photographing location does not match the predetermined location, the processing unit 250 makes a negative determination in S120 and proceeds to S80.

In S130, the processing unit 250 sets and grants a second incentive and proceeds to S70A. In the embodiment, the second incentive is set and granted to the user by a business or other entity that provides the movie creation application when photographing is performed at a predetermined location. For example, the number of candidate songs of music information to be determined in S230, described below, is increased as the second incentive. The candidate songs to be added as the second incentive may be different from the candidate songs added as the first incentive, and the number of songs to be added may be greater than the number of songs added as the first incentive. The user who is granted the second incentive can choose songs from a larger number of candidate songs than users who are not granted the incentive. The process executed in S130 may be referred to as sixth process.

The processing unit 250 may also increase the number of filter candidates to be determined in S220, described below, as a second incentive.

In S210 in FIG. 4 following S80 or S110 in FIG. 3, the processing unit 250 edits the video clips and proceeds to S220. The editing includes confirming the video clips taken in the movie project and deleting unnecessary video clips.

In S220, the processing unit 250 determines the filter processing and proceeds to S230. The processing unit 250 determines the filter, which has been selected by the user from among a plurality of filter candidates prepared in advance by the movie creation application, as the filter applied to the video 10.

In S230, the processing unit 250 determines the music to be added to the information 101 on the video 10 and proceeds to S240. The processing unit 250 determines the BGM information selected by the user from a plurality of candidate BGM songs prepared in advance by the movie creation application as the sound information 102 to be recorded in the video file 100 together with the information 101 on the video 10.

In S240, the processing unit 250 outputs a control signal to the output unit 240 (display) to cause the output unit 240 to play back and display the N video clips taken in the movie project for confirmation by the user. The processing unit 250 also executes the filter processing determined in S220 for the video clips to be played back and displayed. The processing unit 250 also outputs a control signal to the output unit 240 (speaker unit) to play music based on the sound information 102 determined in S230.

In S250, the processing unit 250 determines whether or not to record the video 10. The processing unit 250 makes a positive determination in S250 and proceeds to S260 when an operation indicating recording is performed by the user via the input unit 230. When no operation is performed by the user to instruct recording, the processing unit 250 makes a negative determination in S250 and proceeds to S280.

In S260, the processing unit 250 creates a video 10 by combining a plurality of video clips 1 to 6 together and proceeds to S270. The processing unit 250 also executes the filter processing determined in S220.

In S270, the processing unit 250 adds the sound information 102 determined in S230 to the information 101 on the created video 10, records it in the video file 100, records the video file 100 in a predetermined area of the storing unit 260, and terminates the flow in FIG. 4. In other words, in S270, the music information determined in S230 is added to the information 101 on the video 10. The process executed in S270 may be referred to as ninth process.

In the embodiment, it is also possible to suspend the movie creation application without proceeding to the processes of creating the video 10. In S280, the processing unit 250 determines whether to temporarily terminate the movie creation application. When the processing unit 250 temporarily terminates the movie creation application, it makes a positive determination in S280 and proceeds to S290. When the processing unit 250 continues the movie creation application, it makes a negative determination in S280 and returns to S110 in FIG. 3. When returning to S110, the processing unit 250 continues taking or editing video clips.

In S290, the processing unit 250 temporarily stores the movie project data and other data in a predetermined area of the storing unit 260 (for example, a work area for the movie project) and terminates the flow in FIG. 4. As a result of S290 above, information on the N video clips (including information on the photographing location, determined music, and determined filters) for which the photographing number of video clips in the movie project has reached N is temporarily stored in the storing unit 260.

This makes it possible, for example, to properly store the video clips that have been taken even when the movie creation application process is interrupted because other movie project is executed or other application is started on the electronic device 200.

<Example of Display Screen>

FIGS. 6A to 6D and 7A to 7D are display screens displayed on the output unit 240 based on control signals sent out from the processing unit 250 of the electronic device 200 in which the movie creation application has been launched, and are examples of operation screens as the input unit 230.

<Video Clips List Screen>

Figure 6A:
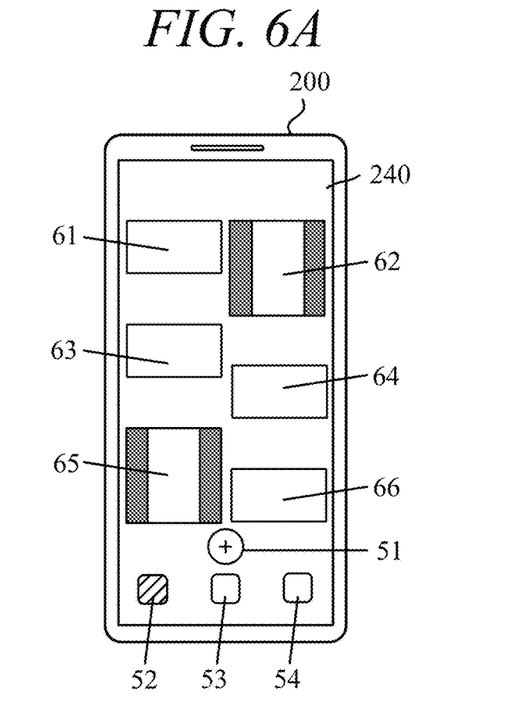
FIG. 6A is a diagram showing an example of a video clips list screen.

FIG. 6A is the video clips list screen that displays a list of video clips taken in the movie project and corresponds to the home screen of the movie creation application. The video clips list screen in FIG. 6A is displayed, for example, on the output unit 240 by the processing unit 250 at the start of flow according to the flowchart (FIG. 3). Each of the reference numerals 61 to 66 indicates the thumbnail of one frame representing each movie project. The thumbnails refer to reduced images (thumbnail images) with a reduced data size to avoid loss of browsability caused by display of video clips with original data size that is too large.

Thumbnails 61, 63, 64 and 66 are thumbnails when the electronic device 200 is held in landscape mode, and thumbnails 62 and 65 are thumbnails when the electronic device 200 is held in portrait mode. If there are too many movie projects to display those thumbnails at once, the user can scroll the screen to view the hidden thumbnails.

A new button 51 is an operation button that the user taps to start photographing as a new movie project. The processing unit 250 proceeds to the process of S10 (FIG. 3) when the new button 51 is tapped. A video clips list button 52 is an operation button to return to the initial display of the present screen (i.e., to switch the display) (FIG. 6A). A map confirmation button 53 is an operation button to switch the display to a screen displaying the photographing locations of the video clips 1 to 6 taken in the movie project on a map screen (FIG. 7C described below). The other work button 54 is an operation button to make the display related to other work items other than those described here (not illustrated).

<Edit Screen>

Figure 6B:
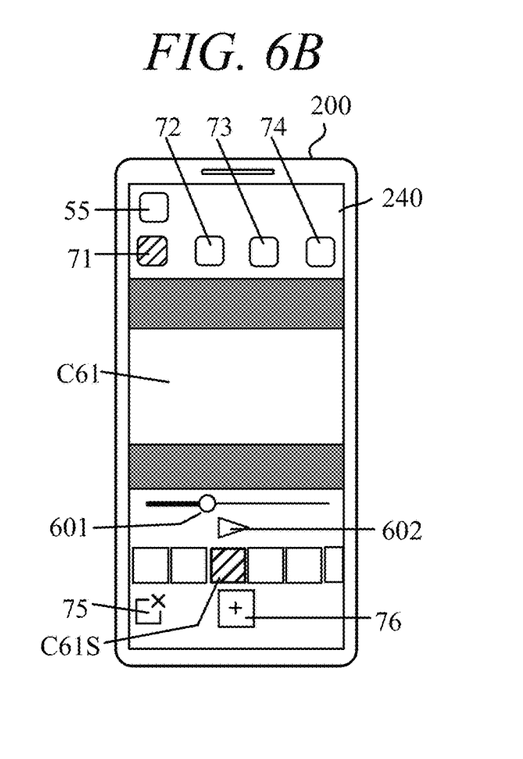
FIG. 6B is a diagram showing an example of an edit screen.

FIG. 6B illustrates an example of the edit screen for the video clips 1 to 6 taken in the movie project. The edit screen illustrated in FIG. 6B is displayed when, for example, the user taps on the thumbnail 61 in the video clips list screen (FIG. 6A). A display area C61 indicates the area where the video clips 1 to 6 taken in the movie project corresponding to the thumbnail 61 are displayed for playback. The processing unit 250 causes the video clip corresponding to the thumbnail selected by the cursor C61S among the six thumbnails representing the video clips 1 to 6 respectively to be played back and displayed in the display area C61.

The user can move the cursor C61S to any of the six thumbnails and tap the play button 602, thereby confirming the video clip corresponding to the thumbnail selected by the cursor C61S. A bar display 601 indicates how much of the 4 seconds of recording time of the video clip during playback has been played back. The user can move forward or backward in the playback position by shifting the knob on the bar display 601 to the left or right.

The user can perform the operation of deleting the video clip corresponding to the cursor C61S by tapping a delete button 75.

A photographing screen button 76 is an operation button to switch the display to the photographing screen (FIG. 6C) and starting photographing (for example, proceeding from S110 to S20). A return button 55 is an operation button to return (i.e., to switch the display) to the display of the video clips list screen (FIG. 6A).

An edit button 71 is an operation button to return (i.e., to switch the display) to the initial display of the present screen (FIG. 6B). A filter button 72 is an operation button to switch the display to the filter decision screen (FIG. 6D below). A music button 73 is an operation button to switch the display to the music decision screen (FIG. 7A below). A confirmation button 74 is an operation button to switch the display to the confirmation screen (FIG. 7B below).

In the embodiment, an edit screen (FIG. 6B), a filter decision screen (FIG. 6D) to be described later, a music decision screen (FIG. 7A) to be described later, and a confirmation screen (FIG. 7B) to be described later are displayed in common in order to enable mutual screen switching between the edit button 71, filter button 72, music button 73, and confirmation button 74. In addition, a return button 55 to return (i.e., to switch the display to) to the above video clips list screen (FIG. 6A) is also commonly displayed on the respective screens (FIGS. 6B, 6D, 7A, and 7B).

<Photographing Screen>

Figure 6C:
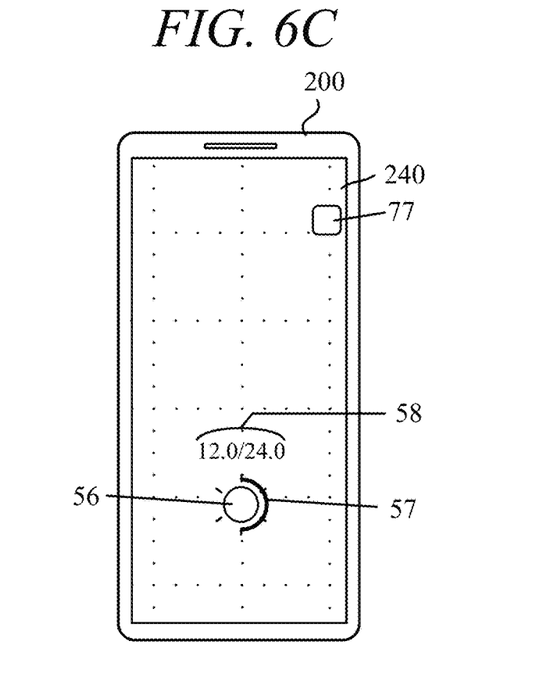
FIG. 6C is a diagram showing an example of a photographing screen.
Figure 6D:
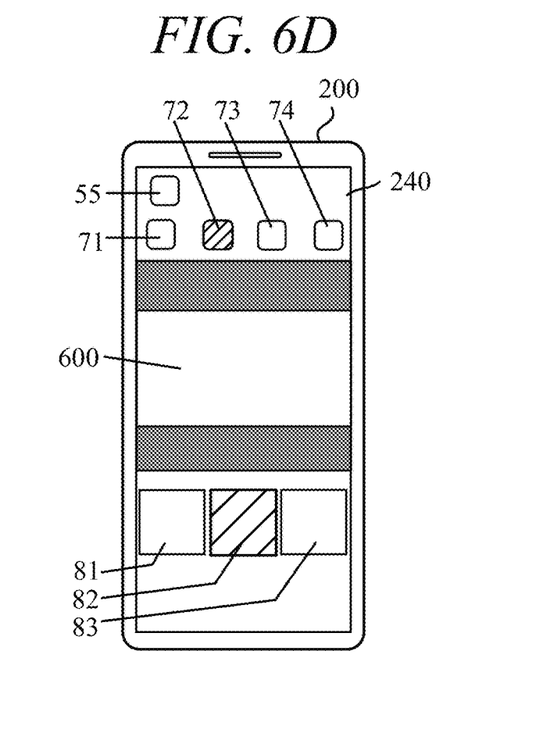
FIG. 6D is a diagram showing an example of a filter decision screen.

FIG. 6C is a diagram illustrating a photographing screen. The photographing screen illustrated in FIG. 6C is displayed when the processing unit 250 executes the process of S20 in the flowchart (FIG. 3). FIG. 6C illustrates an example of the photographing screen when photographing is performed with the electronic device 200 held in portrait mode, but it is also possible to perform photographing with the electronic device 200 held in landscape mode.

In the embodiment, a video clip is taken by the camera 210 for 4 seconds each time the photographing button 56 is tapped. An indicator 57 and a display 58 indicate the recorded time out of the total recording time. FIG. 6C illustrates the state in which 4-second video clips 1 to 3 have been recorded, i.e., 12 seconds of the total recording time of 24 seconds have been recorded. An edit button 77 is an operation button to switch the display to the edit screen (FIG. 6B) for editing.

<Filter Decision Screen>

FIG. 6D is a diagram illustrating a filter decision screen. The filter decision screen illustrated in FIG. 6D is displayed when the processing unit 250 executes the process of S220 in the flowchart (FIG. 4). A display area 600 displays thumbnail images with a reduced data size of video clips taken. Filter candidate buttons 81, 82, 83, . . . indicate a plurality of filter candidates prepared in advance in the movie creation application. The filter candidate buttons 81, 82, 83, . . . are each associated with the above-described filter processing such as sepia tone and monochrome. When the user taps on the filter candidate button 82 selected arbitrarily, the filter processing corresponding to the operated filter candidate button 82 is determined as the filter processing to be applied to the video clips 1 to 6 used to create a video 10. The filter processing corresponding to the operated filter candidate button 82 is executed on the thumbnail image displayed in the display area 600. The user can check the image processing effect of the filter processing in real time with thumbnail image displayed in the display area 600. The user can also re-operate the other filter candidate button to have different types of filter processing executed on the thumbnail image displayed in the display area 600, and compare the differences in image processing effects.

A keyword button (not illustrated) indicating a plurality of keyword candidates prepared in advance in the movie creation application may be displayed on the filter decision screen (FIG. 6D), and when the user taps any keyword button, a filter candidate button indicating a plurality of filter candidates corresponding to the operated keyword button may be displayed again on the filter decision screen. When the user taps any of the filter candidate buttons, a thumbnail image with filter processing corresponding to the operated filter candidate button is displayed in the display area 600.

As described above, description of buttons commonly displayed on the respective screens (FIGS. 6B, 6D, 7A, and 7B) are omitted. In the filter decision screen (FIG. 6D), the filter button 72 is an operation button to return (i.e., to switch the display) to the initial display of the present screen (FIG. 6D).

<Music Decision Screen>

FIG. 7A is a diagram illustrating a music decision screen. The music decision screen illustrated in FIG. 7A is displayed when the processing unit 250 executes the process of S230 in the flowchart (FIG. 4). Music candidate buttons 91, 92, 93, . . . indicate a plurality of recommended music candidates prepared in advance in the movie creation application. The music candidate buttons 91, 92, 93, . . . are each associated with the sound information to play music. When the user taps any music candidate button, the sound information corresponding to the operated music candidate button is determined as the sound information 102 to be recorded in the video file 100 together with the information 101 on the video 10.

The user can also play and listen to the corresponding music by tapping the play button displayed on the right side of the music candidate buttons 91, 92, 93, . . . .

Music candidate buttons 94, 95, 96, . . . indicate a plurality of favorite music candidates prepared in advance in the movie creation application. Each of the music candidate buttons 94, 95, 96, . . . is associated with the sound information for playing the music selected by the user as a favorite in the past. When the user taps any music candidate button, the sound information corresponding to the operated music candidate button is determined as the sound information 102 to be recorded in the video file 100 together with the information 101 on the video 10. As described above, the user can also listen to the corresponding music by tapping the play button displayed on the right side of the music candidate buttons 94, 95, 96, . . . .

As in the case of the filter decision screen (FIG. 6D), a keyword button indicating a plurality of keyword candidates prepared in advance in the movie creation application may be displayed on the music decision screen, and when the user taps any keyword button, music candidate buttons indicating a plurality of music candidates corresponding to the operated keyword button may be displayed again on the music decision screen.

As described above, description of buttons commonly displayed on the respective screens (FIGS. 6B, 6D, 7A, and 7B) are omitted. In the music decision screen (FIG. 7A), the music button 73 is an operation button to return (i.e., to switch the display) to the initial display of the present screen (FIG. 7A).

<Confirmation Screen>

FIG. 7B is a diagram illustrating a confirmation screen. The confirmation screen illustrated in FIG. 7B is displayed when the processing unit 250 executes the process of S240 in the flowchart (FIG. 4). Before proceeding to the processes of S250 and afterward to record a video 10 that combines the video clips 1 to 6 taken N=6 times, the user confirms the six video clips 1 to 6. The display area 600 continues to display the thumbnails of the video clips 1 to 6 processed with the filter determined in S220, together with BGM playing based on the sound information 102 determined in S230.

A bar display 601 indicates how much of the 24 seconds of total recording time of the video clips 1 to 6 has been played back. The user can move forward or backward in the playback position by shifting the knob on the bar display 601 to the left or right.

As described above, description of buttons commonly displayed on the respective screens (FIGS. 6B, 6D, 7A, and 7B) are omitted. In the confirmation screen (FIG. 7B), the confirmation button 74 is an operation button to return (i.e., to switch the display) to the initial display of the present screen (FIG. 7B).

<Map Confirmation Screen>

FIG. 7C is a diagram illustrating a map confirmation screen. When the map confirmation button 53 is tapped in the video clips list screen (FIG. 6A), the map confirmation screen illustrated in FIG. 7C is displayed to replace the video clips list screen.

The map confirmation screen displays on the marks 31 indicating the current position of the electronic device 200, thumbnails 32 representing the respective movie projects, which are displayed at the photographing locations of the video clips representing the movie projects, and marks 34 indicating predetermined locations where a bonus as a second incentive can be get.

The video clip that is representative of the movie project is, for example, the last video clip taken in each movie project, and the thumbnail 32 representative of the movie project is generated based on the first frame image of this video clip.

The number "6" or "12" displayed with the thumbnail 32 indicates that the number of video clips taken in that movie project has reached the number N determined in S10. When the number of video clips taken in the movie project has not reached the number N determined in S10, no numerical value is displayed. This allows the user to easily distinguish between movie projects in which the number of video clips taken has reached a predetermined number and those in which the predetermined number has not. The position indicated by the mark 34 is a predetermined location that is associated with a bonus as the second incentive by the business or other entity that provides the movie creation application. The letter "M" superimposed on the mark 34 with the spot name QV at the predetermined location and the letter "F" superimposed on the mark 34 with the spot name YK at the predetermined location indicate the bonuses associated with them. The letter "M" indicates that the bonus as the second incentive is "music". The letter "F" indicates that the bonus as the second incentive is "filter processing". This allows the user to easily identify the bonus as the second incentive.

The spot name AB indicates a candidate location for photographing for which the first incentive based on total travel distance will be set and granted to the user. In other words, it indicates a candidate location that meets the distance requirement for the first incentive. For example, in a case where traveling another 2 km satisfies the distance requirement for the next first incentive, then a spot name AB at least 2 km away from the current position is displayed as a candidate location. This allows the user to understand that by moving from the current position indicated by the mark 31 to the spot name AB and taking video clips, the user will receive a bonus as the first incentive.

The total travel distance (198 km in the embodiment) calculated in S40 based on the photographing locations of the video clips taken in all movie projects is displayed on the display 33, together with the total number of video clips taken (48 video clips in the embodiment).

The video clips list button 52, map confirmation button 53, and other work button 54 are the same as the buttons described in the video clips list screen (FIG. 6A), and thus, description thereof is omitted. The map confirmation button 53 is used to return (i.e., to switch the display) to the initial display of the present screen (FIG. 7C). The bonus list button 35 is an operation button to switch to the display of the bonus list screen illustrated in FIG. 7D.

FIG. 7D is a diagram illustrating a bonus list screen. The bonus list screen illustrated in FIG. 7D is automatically displayed upon the grant of the first or second incentive (S70B). It is also displayed in place of the map confirmation screen when the bonus list button 35 is tapped on the map confirmation screen (FIG. 7C).

On the bonus list screen, distance information, bonus information, and spot names, etc. are displayed in the order of distance from the current position based on the first travel distance information (travel distance required before the next first incentive is set and granted) and the second travel distance information (travel distance required before the next second incentive is set and granted), in the order of distance from the current position, starting with the shortest distance. In the embodiment, a display 36 displays the bonus information, travel distance, and the candidate location "AB Park" that satisfies the distance condition. In addition, a display 37 displays the bonus information, travel distance, and the predetermined location "QV Mall" where the bonus can be obtained. In addition, a display 38 displays the bonus information, travel distance, and the predetermined location "YK Island" where the bonus can be obtained.

This allows the user to confirm information on a plurality of incentives with different conditions for being set and granted on the same screen. For example, with respect to the first incentive, which is set and granted based on the total travel distance between photographing locations, and the second incentive, which is set and granted based on the fact that the photographing location is a predetermined location, it is possible to know the required travel distance, the candidate location or spot name, and the content of the bonus as an incentive (in the embodiment, music or filter processing).

The return button 55 is an operation button to return (i.e., to switch the display) to the display of the map confirmation screen (FIG. 7C).

According to the above-described embodiment, the following effects can be achieved.

(1) The movie creation application is the movie creation program that causes the processing unit 250 of the electronic device 200, which includes the camera 210 configured to photograph the video clips 1 to 6, the positioning unit 270 configured to acquire position information of the photographing location of each of the video clips 1 to 6, and the output unit 240 (display) configured to display information, to execute the movie project and is stored in a computer-readable storage medium.

The movie creation application is an application that allows the electronic device 200 to execute the movie project that combines the video clips 1 to 6 to create the video 10. The movie project includes: the first process (S10) to determine the number N of the video clips to be photographed by the camera 210 as one single movie project; the second process (S20) to output a control signal to the camera 210 to photograph the determined number N of the video clips 1 to 6; the third process (S30) to output a control signal to the positioning unit 270 to acquire the position information on the photographing location of each of the video clips 1 to 6; the fourth process (S40) to calculating the total travel distance for photographing the determined number N of the video clips 1 to 6 by connecting the photographing locations by the straight lines in order of photographing; the fifth process (S60) to set and grant the first incentive for the user of the camera 210 based on the total travel distance; the sixth process (S130) to set and grant the second incentive for the user when the photographing location is a predetermined location; the seventh process (S70A) to calculate the first travel distance required to set the first incentive, i.e., the first travel distance to be traveled before the next grant of the first incentive, and to calculate the second travel distance required to set the second incentive, i.e., the second travel distance to another specified position different from the above specified position where the next second incentive is to be set and granted; and the eighth process (S70B) to output a control signal to the output unit 240 (display) to display the first travel distance and the second travel distance on one single display screen in order of distance.

With this configuration, the travel distances required to get the bonuses as the first and second incentives with different grant conditions are displayed on the same display screen of the output unit 240 in order of distance. This allows the user to grasp the grant conditions of the incentives as the travel distances at once, for example, by the bonus list screen (FIG. 7D). By accurately informing the user about the information on the bonuses, it will be possible to increase opportunities for the user attracted by the bonuses to take videos.

(2) The above-described eighth process includes outputting the control signal to the display to display the spot name indicating the first candidate location for the first incentive together with the first travel distance as the first travel distance information, and to display the spot name indicating the second candidate location for the second incentive together with the second travel distance as the second travel distance information.

This configuration displays the spot name indicating the candidate location in addition to the travel distance required to get the bonuses. This allows the user to know, for example, from the bonus list screen (FIG. 7D), how far the user needs to travel to get the bonuses as the incentives as the spot name indicating the candidate location. By accurately informing the user about the bonuses, it will be possible to increase opportunities for the user to take videos.

(3) The movie creation application causes the processing unit 250 to execute the seventh and eighth processes when the first incentive is set or when the second incentive is set, i.e., upon the grant of the first incentive in the fifth process or the grant of the second incentive in the sixth process.

With this configuration, for the user who has gotten a bonus as an incentive, the travel distances required to get the next first incentive and the next second incentive are displayed on the same display screen of the output unit 240 in the order of distance. By accurately informing the user about the next bonus, it will be possible to increase the opportunities for the user to take videos.

(4) The movie creation application causes the processing unit 250 to further execute the ninth process (S270), which adds the music information to the information 101 on the video 10 created based on the video clips. The first and/or second incentive is information about the music that can be added in the ninth process.

It is expected that the incentive of music information that can be added to the video 10 created based on the video clips 1 to 6 in the movie project will motivate users who wish to have music information granted to them to further take video clips to create the video 10. In other words, it will increase opportunities for users to take videos.

The above embodiment may be modified into various embodiments. Hereinafter, modifications will be described.

(Modification 1)

As described above, the 4 seconds of recording time per clip, 6 video clips, and 24 seconds of total recording time and playback time for the video 10 in the embodiment are simply examples. The total recording time and playback time of the video 10 may be reduced to 12 seconds or extended to 48 seconds.

(Modification 2)

In the above-described embodiment, the processing unit 250 of the electronic device 200 executing the movie creation application determined a recording time of 4 seconds per clip so that the total recording time would be 24 seconds, depending on the photographing number N determined in S10. Alternatively, the recording time per clip may be configured to be determined based on the duration of the photographing operation by the user.

In the modification 2, the processing unit 250 executes the following process of S10A instead of S10 to S20 in FIG. 3, and executes the following process of S20A instead of S80 in FIG. 3.

In S10A, the processing unit 250 causes the camera 210 to take video clips according to the tap time for the photographing button 56 displayed on the output unit 240, and proceeds to S30. For example, when the tap time is from 0.1 to 0.5 seconds, the photographing time per clip is 0.5 seconds. When the tap time is from 0.5 to 1.0 seconds, the photographing time per clip is 1.0 second. When the tap time is from 1.0 to 1.5 seconds, the photographing time per clip is 1.5 seconds. In the same manner thereafter, the photographing time of the video clip is determined in 0.5 second increments. However, the maximum photographing time per clip shall be 4 seconds.

In S20A following S70, the processing unit 250 determines whether the total recording time of the video clips is above 24 seconds. When the total recording time is above 24 seconds, the processing unit 250 makes a positive determination in S20A and proceeds to S210 in FIG. 4. The processes after S210 are the same as the description of the above-described embodiment.

When the total recording time is less than 24 seconds, the processing unit 250 makes a negative determination in S20A and proceeds to S90. When it does not temporarily terminate in S90 (negative determination), it returns to S10A and repeats the above process. That is, the processing unit 250 causes a video clip to be taken with a photographing time according to the tap time until the total recording time exceeds 24 seconds.

In a case where the total recording time is above 24 seconds, for the portion of the last video clip taken by the camera 210 that exceeds the total recording time of 24 seconds, the processing unit 250 may urge the user to perform an editing operation to delete the excess by displaying a message on output unit 240 or by other means. The portion of the video that exceeds the total recording time of 24 seconds may be automatically deleted.

The processes of S10A and S20A according to the modification 2 described above allow to determine the recording time of video clips constituting the video 10 based on the duration of the photographing operation by the user.

The above embodiment can be combined as desired with one or more of the aforesaid modifications. The modifications can also be combined with one another.

According to the present invention, it becomes possible to allow the user to have more opportunities to take videos.

Above, while the present invention has been described with reference to the preferred embodiments thereof, it will be understood, by those skilled in the art, that various changes and modifications may be made thereto without departing from the scope of the appended claims.

The invention claimed is:

1. A movie creation method for creating a movie by photographing a plurality of video clips, comprising:
executing a movie project, wherein
the movie project includes:
determining a number of the video clips to be photographed by a camera;
outputting a control signal to the camera to photograph the determined number of the video clips;
outputting a control signal to a positioning unit to acquire position information on a photographing location of each of the video clips;
calculating a total travel distance for photographing the determined number of the video clips by connecting the photographing location by a straight line in order of photographing;
setting a first incentive for a user of the camera based on the total travel distance;
setting a second incentive for the user when the photographing location is a predetermined location;
calculating a first travel distance required to set the first incentive;
calculating a second travel distance required to set the second incentive; and
outputting a control signal to a display to display the first travel distance and the second travel distance on one single display screen in order of distance.

2. The movie creation method according to claim 1, wherein
the outputting the control signal to the display includes outputting the control signal to the display to display a first candidate location for the first incentive together with the first travel distance and to display a second candidate location for the second incentive together with the second travel distance.

3. The movie creation method according to claim 1, wherein
the calculating the first travel distance, the calculating the second travel distance, and the outputting the control signal to the display are executed when the first incentive is set or when the second incentive is set.

4. The movie creation method according to claim 1, wherein
the movie project further includes:
adding a music to a video created based on the video clips, wherein at least one of the first incentive and the second incentive is the music.

5. A non-transitory computer readable medium storing a movie creation program that, when executed by an electronic device including: a microcomputer; a camera configured to photograph a video clip; a positioning unit configured to acquire position information on a photographing location of the video clip; and a display configured to display information, causes the microcomputer to execute a movie project for creating a movie by photographing a plurality of the video clips, wherein
the movie project includes:
determining a number of the video clips to be photographed by the camera;
outputting a control signal to the camera to photograph the determined number of the video clips;
outputting a control signal to the positioning unit to acquire the position information on the photographing location of each of the video clips;
calculating a total travel distance for photographing the determined number of the video clips by connecting the photographing location by a straight line in order of photographing;
setting a first incentive for a user of the camera based on the total travel distance;
setting a second incentive for the user when the photographing location is a predetermined location;
calculating a first travel distance required to set the first incentive;
calculating a second travel distance required to set the second incentive; and
outputting a control signal to the display to display the first travel distance and the second travel distance on one single display screen in order of distance.

6. The non-transitory computer readable medium according to claim 5, wherein the outputting the control signal to the display includes outputting the control signal to the display to display a first candidate location for the first incentive together with the first travel distance and to display a second candidate location for the second incentive together with the second travel distance.

7. The non-transitory computer readable medium according to claim 5, wherein
the calculating the first travel distance, the calculating the second travel distance, and the outputting the control signal to the display are executed when the first incentive is set or when the second incentive is set.

8. The non-transitory computer readable medium according to claim 5, wherein the movie project further includes:
adding a music to a video created based on the video clips, wherein at least one of the first incentive and the second incentive is the music.

9. A movie creation apparatus configured to execute a movie project for creating a movie by photographing a plurality of video clips, comprising:
a camera configured to photograph the video clips;
a positioning unit configured to acquire position information on a photographing location of each of the video clips; and
a display configured to display information, wherein
the movie project includes:
determining a number of the video clips to be photographed by the camera;
outputting a control signal to the camera to photograph the determined number of the video clips;
outputting a control signal to the positioning unit to acquire the position information on the photographing location of each of the video clips;
calculating a total travel distance for photographing the determined number of the video clips by connecting the photographing location by a straight line in order of photographing;
setting a first incentive for a user of the camera based on the total travel distance;
setting a second incentive for the user when the photographing location is a predetermined location;
calculating a first travel distance required to set the first incentive;
calculating a second travel distance required to set the second incentive; and
outputting a control signal to the display to display the first travel distance and the second travel distance on one single display screen in order of distance.

* * * * *